United States Patent [19]

Hyatt et al.

[11] Patent Number: 5,452,921
[45] Date of Patent: Sep. 26, 1995

[54] AXIALLY SWAGED FITTING

[75] Inventors: Arthur J. Hyatt, Torrance; Biing-Kwang K. Hsieh, Garden Grove; Charles W. Helsley, Jr., Anaheim, all of Calif.

[73] Assignee: The Deutsch Company, Santa Monica, Calif.

[21] Appl. No.: 106,128

[22] Filed: Aug. 12, 1993

Related U.S. Application Data

[63] Continuation-in-part of Ser. No. 786,012, Oct. 31, 1991, Pat. No.5,303,958.

[51] Int. Cl.$^6$ .................................................. F16L 35/00
[52] U.S. Cl. ........................ 285/23; 285/81; 285/382.2; 285/417
[58] Field of Search ................................ 285/23, 81, 382, 285/2, 417, 322, 323, 382–387, 921

[56] References Cited

U.S. PATENT DOCUMENTS

| | | |
|---|---|---|
| 1,532,886 | 4/1925 | Cowles . |
| 1,994,784 | 3/1935 | Porzel . |
| 2,367,206 | 1/1945 | Davis . |
| 2,383,692 | 8/1945 | Smith . |
| 2,536,354 | 1/1951 | Cowles . |
| 2,547,889 | 4/1951 | Richardson . |
| 2,553,981 | 5/1951 | Richardson . |
| 2,640,716 | 6/1953 | Bigelow . |
| 2,687,316 | 8/1954 | Voegeli . |
| 2,741,498 | 4/1956 | Elliott . |
| 3,114,969 | 12/1963 | Roth . |
| 3,124,874 | 3/1964 | Woolley . |
| 3,149,860 | 9/1964 | Hallesy . |
| 3,159,318 | 12/1964 | Green . |
| 3,210,102 | 10/1965 | Joslin . |
| 3,225,435 | 12/1965 | Anthon . |
| 3,239,250 | 3/1966 | Fonda-Bonardi . |
| 3,262,721 | 7/1966 | Knight . |
| 3,343,252 | 9/1967 | Reesor . |
| 3,375,026 | 3/1968 | Szohatzky . |
| 3,378,282 | 4/1968 | Demler . |
| 3,429,587 | 2/1969 | Kish . |
| 3,466,066 | 9/1969 | Dawson . |
| 3,467,414 | 9/1969 | Downing . |
| 3,474,519 | 10/1969 | Hallesy . |

(List continued on next page.)

FOREIGN PATENT DOCUMENTS

| | | |
|---|---|---|
| 791491 | 9/1935 | France . |
| 986617 | 4/1951 | France . |
| 1069523 | 6/1955 | France . |
| 1140797 | 3/1957 | France . |
| 1560640 | 2/1969 | France . |
| 1027019 | 3/1958 | Germany . |
| 3604213 | 8/1987 | Germany . |
| 524816 | 4/1955 | Italy . |

OTHER PUBLICATIONS

Bulletin 1674 entitled "Rynglok Fitting System" by Aeroquip Linair Division, year 1987, total 8 pages.
Advertisement entitled "The Lokring Pipe And Tube Joining System" produced by Lokring Corporation, total 2 pages.

Primary Examiner—Dave W. Arola
Attorney, Agent, or Firm—Pretty, Schroeder, Brueggemann & Clark

[57] ABSTRACT

A fitting for attachment to a tube by swaging comprises a cylindrical sleeve having a tapered outer surface and an inner surface for receiving the tube. A cylindrical swaging ring having a tapered inner surface engages the tapered outer surface of the sleeve such that axial movement of the ring in a forward direction with respect to the sleeve causes the ring to apply a radial force to the sleeve to swage it to the tube. The swaging ring is locked onto the sleeve both before and after swaging by one or more protrusions on the outer surface of the sleeve which cooperatively engage an annular groove in the swaging ring. The location of the protrusions and groove in relation to the tapered surfaces on the swaging ring and sleeve is especially configured to provide smooth axial loading during swaging and increase tube retention capabilities at the conclusion of the swaging operation.

16 Claims, 5 Drawing Sheets

U.S. PATENT DOCUMENTS

| | | |
|---|---|---|
| 3,498,648 | 3/1970 | Hallesy . |
| 3,501,178 | 3/1970 | Watts . |
| 3,528,689 | 9/1970 | Roe . |
| 3,572,779 | 3/1971 | Dawson . |
| 3,674,292 | 7/1972 | Demler . |
| 3,675,949 | 7/1972 | Dawson . |
| 3,765,708 | 10/1973 | Pease et al. . |
| 3,827,727 | 8/1974 | Moebius . |
| 3,893,720 | 7/1975 | Moebius . |
| 4,025,092 | 5/1977 | Wakefield . |
| 4,026,006 | 5/1977 | Moebius . |
| 4,061,367 | 12/1977 | Moebius . |
| 4,103,941 | 8/1978 | Stoll . |
| 4,451,069 | 5/1984 | Melone . |
| 4,482,174 | 11/1984 | Puri . |
| 4,598,938 | 7/1986 | Boss et al. . |
| 4,705,302 | 11/1987 | Beiley . |
| 4,858,968 | 8/1989 | Moebius . |
| 5,080,547 | 1/1992 | Moghe . |
| 5,088,771 | 2/1992 | Hosseinian et al. . |
| 5,110,163 | 5/1992 | Benson et al. . |
| 5,114,191 | 5/1992 | Sareshwala . |
| 5,181,752 | 1/1993 | Benson et al. . |

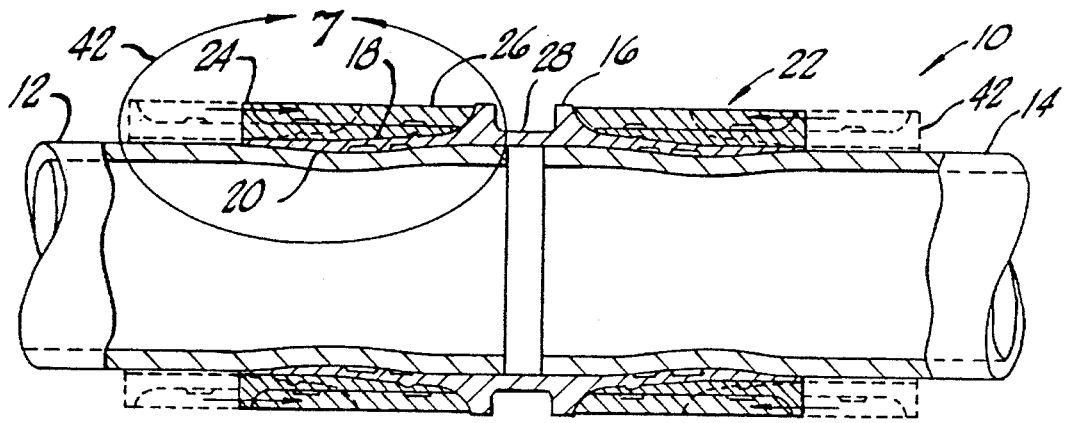
fig. 6.
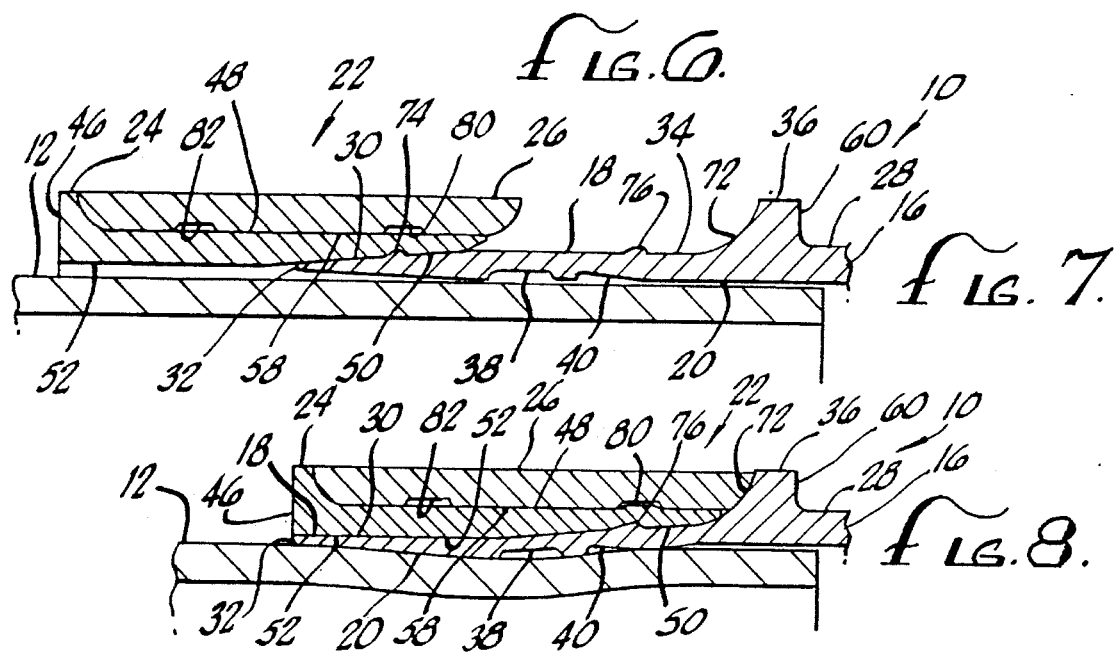
fig. 7.
fig. 8.
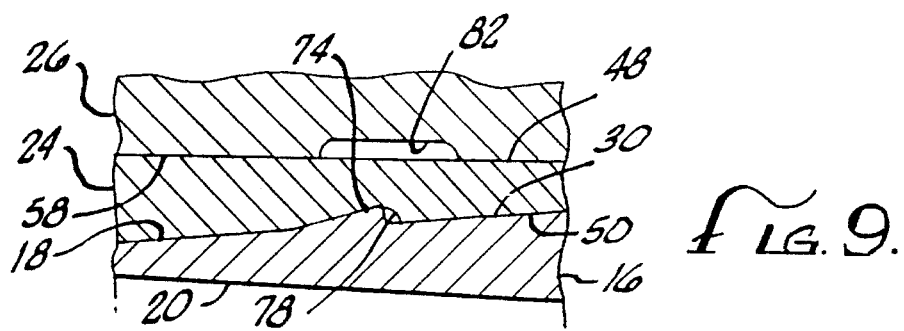
fig. 9.
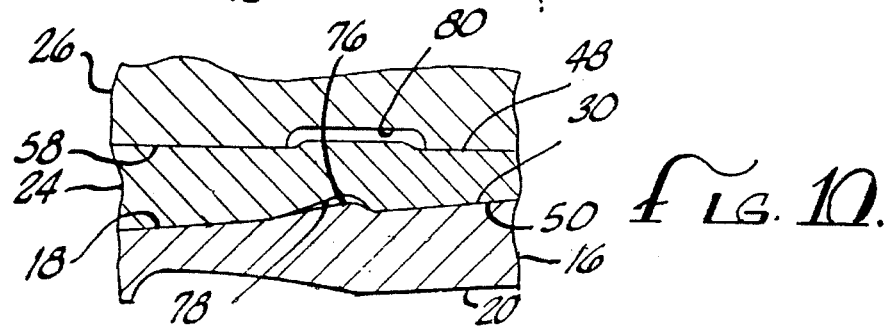
fig. 10.

5,452,921

AXIALLY SWAGED FITTING

This is a continuation-in-part of application Ser. No. 786,012 filed Oct. 31, 1991 now U.S. Pat. No. 5,303,958.

BACKGROUND OF THE INVENTION

The present invention relates to fluid fittings for connection to tubes and pipes by swaging and, more particularly, to a swagable fitting having an axially movable swaging ring for applying radial swaging force.

Fittings are commonly used to connect metal tubes and pipes to each other for use in a variety of applications, such as in the aerospace industry, to convey fuel, hydraulic control fluids and the like in an aircraft or space vehicle. In these applications, it is critical that there be a secure connection between the fitting and the tubes in order to withstand vibration and other adverse conditions without failure.

Various fittings have been developed in the past to connect tubes to each other. In one type of fitting, a radial swaging force is applied to the fitting and the tube, which may be done externally around the fitting or internally within the tube. In either case, the radial swaging force is applied directly to the fitting and tube by the tool. In some instances, the inner surface of the fitting has a plurality of axially spaced annular grooves into which the material of the tube is deformed by the swaging tool to make the swaged connection. In other instances, a curved or irregular configuration on the outer surface of the fitting is transferred to the inner surface of the fitting upon swaging, which causes the tube to deflect and conform to the irregular configuration and thereby make the connection.

Another type of fitting comprises a cylindrical sleeve having a tapered outer surface and a cylindrical inner surface for receiving a tube. A deforming ring surrounds the sleeve and has a tapered inner surface which matches and engages with the tapered outer surface of the sleeve. Before swaging, the deforming ring is positioned outwardly with respect to the sleeve such that no radial force is applied by the deforming ring to the sleeve. During swaging, the deforming ring is moved axially in a forward direction over the sleeve such that the interaction of the tapered surfaces on the ring and the sleeve applies a radial force deforming the sleeve and the tube inwardly to make a swaged connection between them. These fittings shall be generally referred to as axially swaged fittings.

In the aircraft industry and in the marine and commercial fields, it is desirable to have the weight of the hydraulic plumbing installation as low as possible. All of the fittings described above pose a problem in this regard, since many hundreds of them are used in an aircraft, thus making their total weight contribution a noticeable amount. Because of the high flexure and operating pressures in the tubes, the fittings are made of metal and generally must be sufficiently large in both size and weight to resist fatigue failure and to ensure adequate holding power and tube retention capability. As a result, most fittings in use today are relatively large and heavy and, therefore, add undesirable weight to the aircraft. Since axially swaged fittings have a deforming ring, which remains as a permanent part of the swaged fitting, these fittings tend to add extra undesirable weight.

A related problem which especially concerns axially swaged fittings is the inability to conveniently hold the deforming ring onto the sleeve prior to swaging, and then to securely lock the ring to the sleeve after swaging. In some instances, the deforming ring is preassembled onto the sleeve and held there by frictional engagement or other means. However, if the frictional engagement is insufficient, the deforming ring may become separated from the sleeve and sometimes lost or damaged. If the frictional engagement is too great, however, the outer end of the sleeve may be radially pre-deformed to such an extent that the tubing will not fit within the radially constricted sleeve. In other instances, the deforming ring is simply loosely packaged with the sleeve and subject to loss or damage or, even worse, the ring may be incorrectly installed when placed over the sleeve.

Accordingly, there has existed a definite need for an axially swaged fitting that is smaller in size and lighter in weight than the known fittings, while still maintaining a high tube retention capability. There has further existed a definite need for an axially swaged fitting in which the deforming ring is securely attached to the swaging sleeve prior to swaging, without permanently deforming the sleeve's tube insertion diameter, and in which the ring is positively locked to the sleeve after swaging. The present invention satisfies these and other needs and provides further related advantages.

SUMMARY OF THE INVENTION

The present invention is embodied in a compact and lightweight fitting having a high tube retention capability. The fitting comprises a substantially cylindrical sleeve having a tapered outer surface and an inner surface defining an axial bore for receiving the tube at an outer end of the sleeve. The inner surface of the sleeve includes a plurality of axially spaced annular grooves into which the outer surface tube deforms upon swaging. A substantially cylindrical swaging ring having a tapered inner surface is adapted to engage the tapered outer surface of the sleeve. Axial movement of the ring in a forward direction with respect to the sleeve therefore causes the ring to slide over and apply a radial force to the sleeve which swages the sleeve to the tube.

In accordance with the invention, the swaging ring is advantageously locked onto the sleeve both before and after swaging. This is accomplished by first and second annular protrusions spaced axially from each other on the outer surface of the sleeve. An annular groove on the inner surface of the swaging ring positively engages the first annular protrusion to hold the ring onto the sleeve before swaging, without constricting the diameter of the sleeve. During swaging, the first and second annular protrusions are deformed radially inward. After swaging, the second annular protrusion springs back into and engages the annular groove in the ring to form a lock inhibiting relative axial movement in a reverse direction between the ring and the sleeve.

In one embodiment, the outer surface of the sleeve has a first cylindrical surface, a first tapered surface, a second tapered surface, and a second cylindrical surface. The first annular protrusion separates the two tapered surfaces on the sleeve. The second annular protrusion is located inwardly from the first annular protrusion at the approximate center of the second cylindrical surface. The inner surface of the swaging ring comprises a substantially cylindrical surface at the outer end of the swaging ring, a basic tapered surface at its center and a lead in tapered surface at its inner end. The cylindrical surface and the basic tapered surface on the swaging ring join each other to define a shoulder. The axial distance between the shoulder and the beginning of the lead in tapered surface on the swaging ring defines the axial length of the basic tapered surface on the swaging ring. The difference in the diameters between the basic tapered surface and the lead in tapered surface, at the beginning of the lead in tapered surface, creates an annular groove.

The fitting is designed such that the axial lengths of the first tapered surface on the sleeve and the basic tapered surface on the swaging ring are substantially the same. In addition, the axial distance between the first annular protrusion and the second annular protrusion on the sleeve is substantially the same as the axial length of the first tapered surface on the sleeve.

Prior to swaging, when the annular groove on the swaging ring is engaged with the first annular protrusion on the sleeve, the fitting is configured such that the axial distance between the inner end of the swaging ring and a ring stop on the sleeve is substantially the same as the axial length of the first tapered surface on the sleeve. In this same position of the ring, with the annular groove engaged with the first annular protrusion prior to swaging, the axial distance between the outer end of the sleeve and the outer end of the swaging ring is substantially the same as the axial length of the first tapered surface on the sleeve.

The particular arrangement of the tapered surfaces, cylindrical sections, annular protrusions, and the annular groove, as described above, are designed to minimize the size and weight of the fitting, as well as the swaging tool that is used to install it. This particular combination of structural features also provides a relatively smooth axial load buildup throughout the majority of the swaging operation, thereby reducing unnecessary stresses and uneven axial loading. At the very end of the swaging operation, however, the axial loading force is first sharply increased and then sharply reduced, indicating that the swaging ring is properly locked in place.

The fitting is adapted to provide a very secure connection between the sleeve and the tube after swaging. This is accomplished by locating the plurality of annular grooves on the inner surface of the sleeve at an axial location that is substantially inward from the first annular protrusion and, in one form, between the first annular protrusion and the second annular protrusion. These annular grooves on the inner surface of the sleeve have vertical sidewalls that grip the tube upon swaging, causing some of the material of the tube to deform into these annular grooves. By radially aligning a vertical sidewall of the outermost of one of these annular grooves with the first annular protrusion, the shoulder on the inner surface of the swaging ring is adapted to apply increased radial forces to the sleeve and the tube at the conclusion of the swaging operation. This facilitates metal-to-metal sealing between the sleeve and the tube. It also provides an improved "grip" on the tube that improves resistance to flexure and pressure loading.

When the swaging ring is in its final position at the end of the swaging operation, the deformed area created by the interaction between the ring and the sleeve substantially resembles a parallelogram, such that a necked-down single wave form (also called a bell mouth) is formed in the sleeve. The peak of this wave form is radially aligned with and generated by the shoulder on the swaging ring and the first annular protrusion on the sleeve. Using this arrangement, all of the annular grooves on the inner surface of the sleeve are adapted to generate localized material indentations in the tube, at the back side of the wave form, to thereby enhance the gripping and sealing capability of the fitting.

It will be noted that the swaging ring may be constructed from any suitable material. For example, the swaging ring may be constructed entirely from a homogenous material. Accordingly, the swaging ring may be constructed from any one of a group of homogenous materials, such as copper, brass, stainless steel, Incoloy, aluminum, titanium and similar suitable homogenous materials. Alternatively, if desired, the swaging ring also may be constructed from a composite material, or the swaging ring may comprise a two-piece ring assembly constructed from a combination of homogenous and composite materials.

Other features and advantages of the invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6 is a cross-sectional elevational view of a portion of another embodiment of a fitting embodying the novel features of the present invention and shown connecting two tubes to each other;

FIG. 7 is an enlarged cross-sectional view of a portion of the fitting, showing a tube inserted into one end of the fitting prior to swaging;

FIG. 8 is an enlarged cross-sectional view of the fitting, similar to FIG. 7, showing the fitting and the tube after the swaging operation has been completed;

FIG. 9 is an enlarged and isolated cross-sectional view of a portion of the fitting illustrating the manner in which a swaging ring assembly is positively connected to a sleeve of the fitting prior to swaging;

FIG. 10 is an enlarged and isolated cross-sectional view, similar to FIG. 9, showing the manner in which the swaging ring assembly is locked to the sleeve after swaging;

DESCRIPTION OF THE PREFERRED EMBODIMENTS

Figure 1:
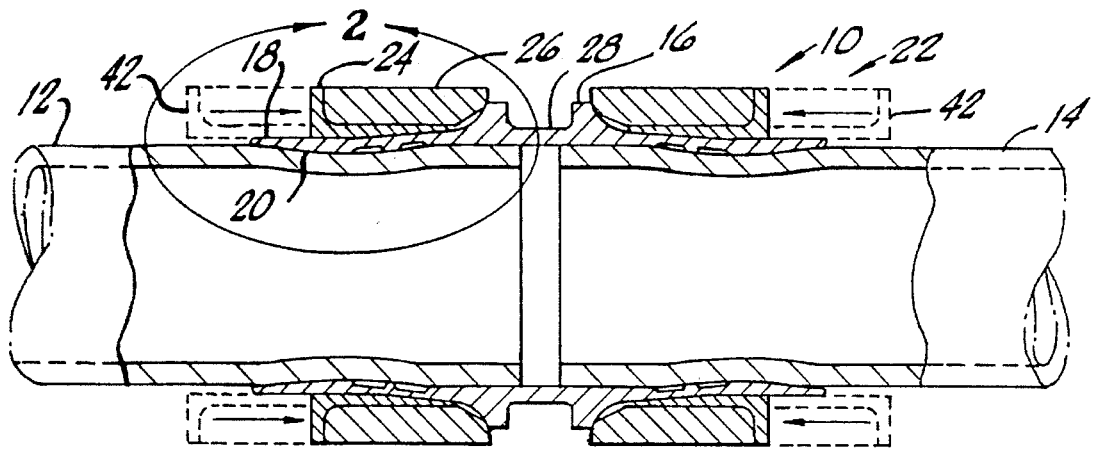
FIG. 1 is a cross-sectional elevational view of one embodiment of a fitting embodying the novel features of the present invention and shown connecting two tubes to each other.

As shown in the accompanying drawings, the present invention is embodied in a fitting, indicated generally by the reference number 10, for use in connecting two tubes 12 and 14 to each other. The fitting 10 comprises a substantially cylindrical sleeve 16 having an outer surface 18 and an inner surface 20 defining an axial bore for receiving the tubes 12 and 14. The fitting 10 is relatively compact and lightweight, yet it has a higher tube retention capability than bulkier and heavier fittings used for the same purpose. In one embodiment, these advantages are provided by a swaging ring assembly 22 having a swaging insert 24 and a special swaging ring 26 constructed from a lightweight, high strength material, such as a composite material. In another embodiment, these advantages are provided by a special configuration and relationship between the interacting surfaces of the sleeve 16 and the ring assembly 22.

As shown best in FIG. 1, the fitting 10 has a symmetrical configuration on opposite sides of an annular groove 28 which essentially divides the fitting 10 into two separate but identical portions. For ease of reference and clarity, only one of these portions will be described, since it is understood that the other portion of the fitting 10 is structurally and functionally the same. It also should be understood that, depending on the particular application for the fitting 10, a complete fitting may comprise only one of the two portions. For example, the fitting 10 may comprise an end cap to close off the end of a tube. Alternatively, the fitting 10 may provide some other coupling function, such as a tee, cross-fitting, elbow or a reducer, in which case two or more portions of the fitting would be needed to connect multiple tubes.

Figure 2:
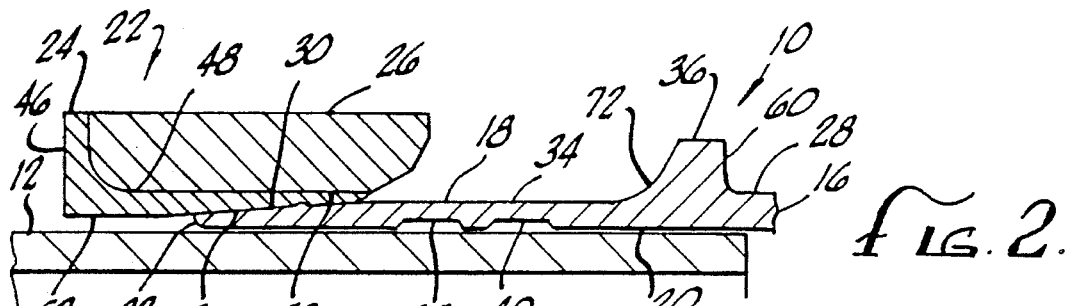
FIG. 2 is an enlarged cross-sectional view of a portion of the fitting, showing a tube inserted into one end of the fitting prior to swaging.
Figure 3:
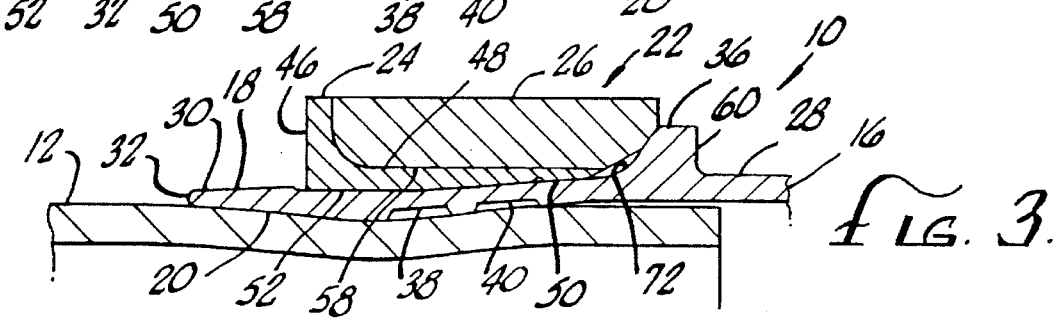
FIG. 3 is an enlarged cross-sectional view of the fitting, similar to FIG. 2, showing the fitting and the tube after the swaging operation has been completed.

FIGS. 2–3 show one embodiment of the sleeve 16 and ring assembly 22 in closer detail. More particularly, the outer surface 18 of the sleeve 16 has a tapered region 30 near its outer end 32 and a substantially cylindrical region 34 spaced inwardly from the outer end 32, terminating in an annular ring stop 36 at the inner end of the sleeve 16. The inner surface 20 of the sleeve 16 has two or more axially spaced annular grooves 38 and 40 into which the material of the tube 12 is deformed upon swaging. The use of these annular grooves 38 and 40 is well known and, therefore, will not be described in further detail. However, it should be understood that other means for causing the sleeve 16 to securely engage the tube 12 after swaging may be used, and the particular means shown in the drawings, in this case the axially spaced annular grooves 38 and 40, should not be construed as limiting the claimed invention. For example, it is also known that a curved or irregular configuration may be used on the sleeve 16 instead of axially spaced annular grooves 38 and 40. In these latter applications, the tube 12 is deflected and conforms to the curved or irregular configuration of the sleeve 16 during the swaging process to make the swaged connection. Various other means for forming a secure connection between the sleeve 16 and the tube 12 upon swaging will be apparent to those skilled in the art.

Swaging of the sleeve 16 to the tube 12 is caused by axial movement of the ring assembly 22 in a forward direction (to the right in the drawings), as shown in FIGS. 2–3. FIGS. 1–2 also show the pre-swaging position of the ring assembly 22 in phantom lines 42. As noted above, the ring assembly 22 comprises the swaging insert 24 and the swaging ring 26. The swaging insert 24 comprises a substantially cylindrical body with an outer end in the form of a flange 46 extending radially outward. The insert 24 also has a cylindrical outer surface 48 and a cylindrical inner surface 52 with a tapered region 50 adapted to match with and engage the tapered region 30 of the sleeve 16. The angle of the tapered region 30 on sleeve 16 and the tapered region 50 on the insert 24 is approximately 5 degrees, but it may be at any other appropriate angle. The swaging ring 26 is substantially cylindrical and has an inner surface 58 adapted to engage with and fit against the outer surface 48 and flange 46 of the insert.

To swage the sleeve 16 to the tube 12, the ring assembly 22 is moved axially in the forward direction from the position shown in FIG. 2 to the position shown in FIG. 3. This axial movement of the ring assembly 22 with respect to the sleeve 16, as a result of the interaction between the tapered regions 30 and 50 on the sleeve 16 and insert 24, respectively, causes the ring assembly 22 to apply a radial force to the sleeve 16. This radial force swages the sleeve 16 to the tube 12 to form the necessary connection. Movement of the ring assembly 22 in the forward direction may be accomplished by a swaging tool (not shown) having a pair of jaws which engage the flange 46 on the insert 24 and a vertical surface 60 on the ring stop 36. The jaw engaging the ring stop 36 remains stationary, while the jaw engaging the flange 46 is moved axially toward the other jaw. Alternatively, the jaw engaging the ring stop 36 may move and the jaw engaging the flange may be stationary. Movement of the jaws in this manner may be carried out by hydraulic, pneumatic or other appropriate means. In any event, at the conclusion of the swaging operation, the material of the tube 12 will have deformed generally into an hour glass shape, as shown in FIG. 3, and will have locally deformed into the axially spaced annular grooves 38 and 40 on the inner surface 20 of the sleeve 16, thereby forming a secure swaged connection.

Figure 11:
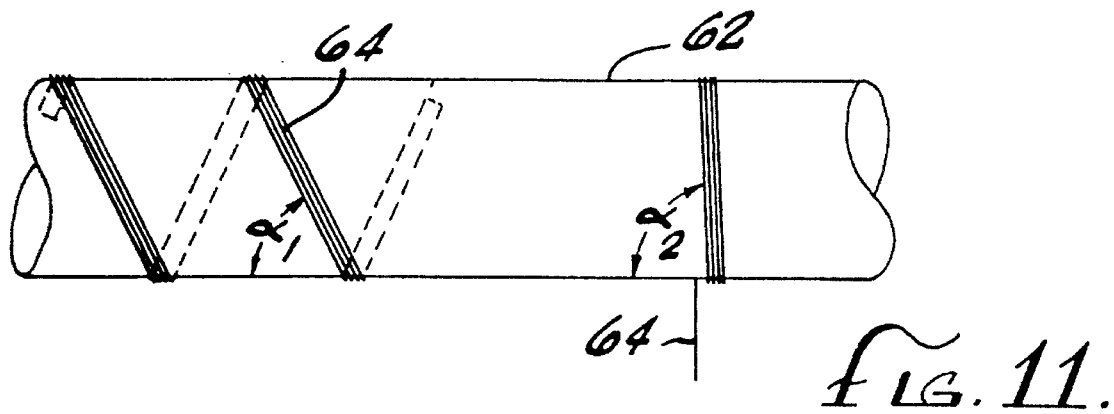
FIG. 11 is an elevational view of a mechanism for winding the material used to make the swaging ring.
Figure 12:
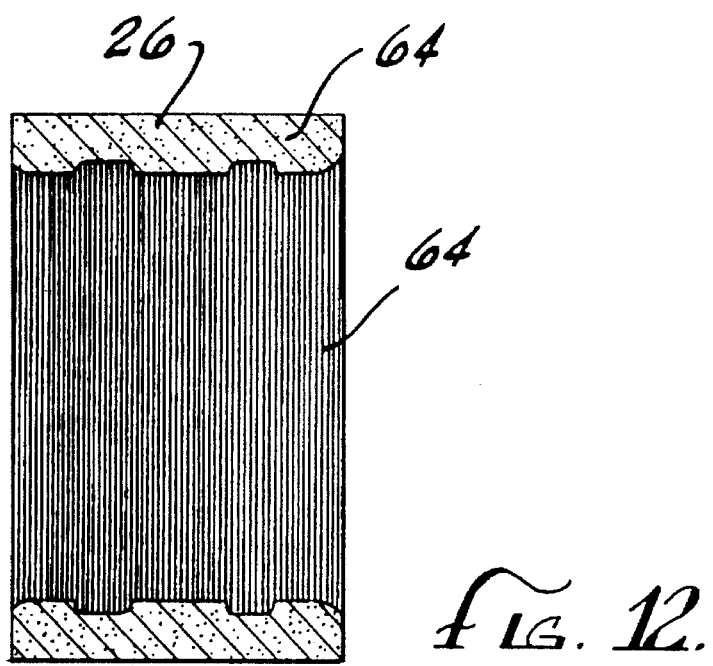
FIG. 12 is a cross-sectional view of the swaging ring, showing the alignment in a circumferential direction of high strength composite fibers used to construct the ring.

In accordance with one embodiment of the invention, the ring 26 is constructed from a lightweight, high strength material having relatively high tensile strength and a high modulus of elasticity, with relatively low density and low elongation properties. In one embodiment, the material is a composite material comprising an epoxy resin matrix which is reinforced by high strength graphite fibers 64. (FIGS. 11–12). These graphite fibers 64 are tightly packed within the epoxy resin matrix and are oriented in a circumferential direction around the ring 26 in a continuous fashion, as shown in FIG. 12. The strength properties of the composite material may be varied as desired and are dependent upon factors such as fiber density and fiber orientation within the epoxy resin matrix. For purposes of the present invention, the following properties have been found to be suitable for materials used in constructing the composite swaging ring 26.

In one form, the epoxy resin has a tensile strength of at least 5,000 psi and a modulus of elasticity of at least 500 psi and, preferably, a tensile strength of between approximately 5,000 to 12,000 psi and a modulus of between approximately 500 to 1,200 psi. An epoxy resin having these properties is bisphenol type A epoxy resin available from Advanced Composite Products & Technology of Huntington Beach, Calif. Similarly, the high strength graphite fiber has a tensile strength of at least 200,000 psi and a modulus of elasticity of at least 10,000,000 psi and, preferably, a tensile strength of between approximately 200,000 to 20,000,000 psi and a modulus of between approximately 10,000,000 to 150,000,000 psi. High strength graphite fiber having these properties also is available from Advanced Composite Products & Technology Inc. of Huntington Beach, Calif. A fully constructed composite swaging ring 26 having the properties described above has a tensile strength which is greater than about 180,000 psi, a modulus of elasticity which is greater than about 15,000,000 psi, a density of between approximately 0.050 to 0.080 pound per cubic inch and elongation of between approximately 0.003 to 0.020 inch/inch. A suitable material for both the sleeve 16 and the swaging insert 24 is titanium, such as 6AL-4V titanium available from Titanium Sales of Cerritos, Calif.

The structural relationship between the insert 24 and the ring 26 described above provides important advantages in terms of function and operation of the fitting 10. The insert 24, which preferably is made of titanium, has relatively high strength to resist shear and bearing loads, and relatively high tensile strength in the axial direction. This allows the insert 24 to withstand high loads of shear and bearing which are generated when the insert 24 is moved over the sleeve 16 during swaging. However, the insert 24 has relatively low tensile strength in the circumferential (hoop) direction. This is where the swaging ring 26 becomes important.

The swaging ring 26, which is preferably constructed from the high strength composite materials described above, provides an ideal back-up of the insert 24 in the circumferential direction. This is because of the ring's relatively high tensile strength in the circumferential direction, which allows it to withstand high hoop swaging loads which occur during swaging. These hoop loads are first generated in the insert 24 and then transferred mostly to the ring 26. This load transfer takes place because of the difference in modulus of elasticity between the insert 24 and the ring 26. Since the modulus of the ring 26 preferably is roughly twice that of the insert 24, as soon as the insert 24 starts to deform radially outwardly, it becomes constrained by the swaging ring 26 with its higher modulus of elasticity, low elongation properties and high tensile strength in the circumferential direction. Although the ring 26 is relatively weak to resist shear and bearing loads, and in its axial tensile strength, its outstanding strengths in the other areas compliment the insert 24 to provide a combination of structural and functional features enabling the high tube retention capability and high tube operating pressure.

By varying the properties of the material forming the swaging ring 26, the ring can be optimized to such an extent that it may be used alone, without the swaging insert 24. In this aspect of the invention, the two-piece swaging ring assembly 22 described above is substituted for a one-piece swaging ring assembly, comprising only the swaging ring 26, but having the combined structural configuration of the two-piece assembly 22. Since the ring 26 must now also serve the function of the swaging insert 24, the inner surface of the ring 26 must have sufficient hardness at the swaging interface, as well as sufficient tensile strength in the circumferential direction. Moderate shear strength also must be provided. This can be achieved by using a composite material with a helical winding of fibers 64 such that the inner surface of the ring 26 meets the requirements of strength and hardness in an optimal manner.

In this regard, FIG. 11 shows an apparatus such as a mandrel 62 for winding of the composite material to form the swaging ring 26. To form the helical winding, the winding angle for the composite fibers 64 is less than 90 degrees, and preferably no less than 45 degrees, at the inner surface of the ring 26. Thus, the initial layers of the fiber are wound at a first angle $\alpha_1$ of about 45 degrees. Subsequent layers of the composite fiber 64 approaching the outer surface of the ring 26 may be wound at a greater angle $\alpha_2$ approaching 90 degrees. The same mandrel 62 may be used to wind the composite fibers 64 used to form the ring 26 of the two-piece ring assembly 22. In the two-piece ring assembly 22, however, the composite fibers preferably are wound at an angle $\alpha_2$ closely approaching 90 degrees throughout the layers of the ring 26. This is because high strength to resist shear, bearing and tensile loads in the axial direction is not needed in the swaging ring 26, since that is supplied by the insert 24. Hence, the near 90 degree winding angle $\alpha_2$ for the composite fibers provides the highest circumferential tensile strength and modulus of elasticity.

Thus, it will be appreciated that appropriate fiber orientation may be varied as desired to provide the maximum possible tensile strength in the circumferential direction, while providing the required hardness and shear strength at the swaging interface when desired. In this regard, FIG. 12 shows the preferred orientation of the graphite fibers 64 in the swaging ring 26. It is noted that these fibers 64 are substantially all oriented in a circumferential direction around the ring 26.

Figure 4:
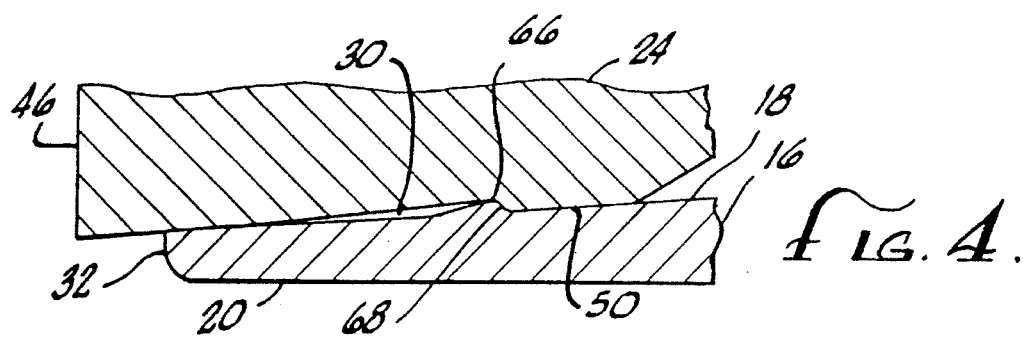
FIG. 4 is an enlarged and isolated cross-sectional view of a portion of the fitting showing the manner in which a swaging ring is positively connected to a sleeve of the fitting prior to swaging.
Figure 5:
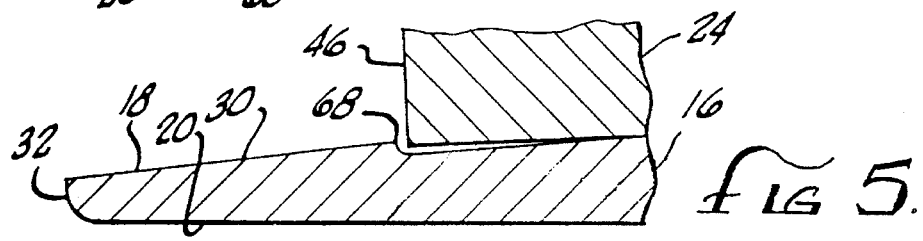
FIG. 5 is another enlarged and isolated cross-sectional view, similar to FIG. 4, showing the manner in which the swaging ring is locked to the sleeve after swaging.

FIGS. 4-5, and to a lesser extent FIGS. 2-3, illustrate a method for locking the swaging ring assembly 22 onto the sleeve 16 both before and after swaging. This locking feature is accomplished by providing an annular protrusion 66 on the outer surface 18 of the sleeve 16, in the area of the sleeve's tapered region 30, which is adapted to engage an annular groove 68 on the inner surface 52 of the swaging insert 24 in the area of its tapered region 50. Before swaging, therefore, and during pre-assembly of the fitting 10 prior to shipping, the ring assembly 22 may be pushed onto the outer end 32 of the sleeve 16, deforming the annular protrusion 66 until the annular protrusion 66 on the sleeve 16 engages the annular groove 68 in the ring assembly 22. The location of the protrusion 66 and the groove 68 are such that little or no radial force is applied by the ring assembly 22 to the sleeve 16. Later, during swaging, the ring assembly 22 is moved axially with respect to the sleeve 16, deforming the annular protrusion 66, until the forward end of the ring assembly 22 engages the curved surface 72 of the ring stop 36. This ends the swaging operation, at which point the flange 46 at the outer end of the ring assembly 22 will have been moved axially in the forward direction just past the annular protrusion 66. When the swaging tool (not shown) is removed, the frictional engagement between the ring assembly 22 and the sleeve 16 at the swaging interface inhibits reverse movement of the ring assembly 22. However, the protrusion 66, which springs back from its deformed condition when the ring assembly 22 passes over it, functions as a stop which engages the flange 46 at the outer end of the ring assembly 22 to form a lock that further inhibits reverse movement of the ring assembly. Thus, positive mechanical engagement between the outer end of the ring assembly 22 and the protrusion 66 maintains a reliable swaged connection between the sleeve 16 and the tube 12.

FIGS. 6-10 show another embodiment of the fitting 10.

This fitting 10 has essentially the same structural and functional properties of the fitting 10 described above in connection with FIGS. 1–5. However, it will be noted that the two-piece ring assembly 22 is longer in the axial direction and the composite ring 26 is somewhat thinner in the radial direction. The fitting 10 also employs a somewhat different mechanism for locking the ring assembly 22 onto the sleeve 16 prior to and after swaging.

As shown best in FIGS. 9–10, and to a lesser extent in FIGS. 7–8, the ring assembly 22 is locked onto the sleeve 16, both before and after swaging, by two axially spaced annular protrusions 74 and 76 on the outer surface 18 of the sleeve 16. The first annular protrusion 74 is adjacent to the outer end 32 of the sleeve 16 on its tapered region 30, and the second annular protrusion 76 is spaced inwardly on the cylindrical region 34 of the sleeve 16. An annular groove 78 on the tapered region 50 of the swaging insert's inner surface 52 is adapted to engage the first annular protrusion 74 to hold the ring assembly 22 onto the sleeve 16 before swaging without deforming or constricting the sleeve.

During swaging, the tapered region 50 on the insert 24, in a location forward of the annular groove 78, passes over the second annular protrusion 76 and elastically deforms it in a radially inward direction. Advancement of the swaging ring assembly 22 in the forward direction continues until the forward end of the ring assembly 22 engages the curved surface 72 of the ring stop 36. This ends the swaging operation, at which point the annular groove 78 will have reached the second annular protrusion 76, where the protrusion 76 is allowed to spring back into the groove 78. Hence, the protrusion 76 is deformed radially outwardly into the groove 78 of the insert 24, thereby creating a positive locking relationship between the sleeve 16 and the ring assembly 22 that, in addition to the frictional engagement between these two components at the swaging interface, inhibits axial movement of the ring assembly 22 in a reverse direction over the sleeve 16.

The spring back of the protrusion 76 also deforms the material of the insert 24 radially outward into a groove 80 of the swaging ring 26. Another annular groove 82 also is provided on the inner surface of the swaging ring 26 to facilitate assembly of the fitting 10, so that either end of the ring 26 can be assembled onto the insert 24. This prevents the ring 26 from being incorrectly installed on the insert 24.

In both embodiments of the fitting 10 described above, the protrusions 66 and 76 advantageously provide a surface forming an angle of about 45 degrees or greater with respect to the longitudinal axis of the sleeve for engagement with the annular grooves 68 and 78. This relatively high ramp angle of the protrusions 66 and 76, in combination with the spring back properties of the sleeve 16, substantially inhibit axial movement of the ring assembly 22 in a reverse direction over the sleeve 16. This is a significant advantage as compared to prior art fittings which have relatively low ramp angles, usually less than about 2 degrees, and which depend primarily upon the natural spring back contour generated by the tube and outer end of the sleeve, to the extent that the sleeve extends beyond the outer end of the swaging ring, to hold the ring in a locked position.

The embodiment of the fitting 10 in FIGS. 6–10 also provides a locking relationship between the swaging ring 26 and the swaging insert 24. At the end of the swaging operation, as noted above, the material of the insert 24 will have been deformed into the groove 80. This provides high contact pressure which results in a secure connection preventing both axial and circumferential movement of the ring 26 with respect to the insert 24. This holds the ring assembly 22 in position so that it can withstand the types of environments encountered in service. In this regard, should the swaging ring 26 somehow become removed from the fitting, either partially or wholly as a result of corrosion or other means, the material of the swaging insert 24 has the necessary strength characteristics to maintain a swaged and secure connection between the sleeve 16 and the tube 12.

Figure 13:
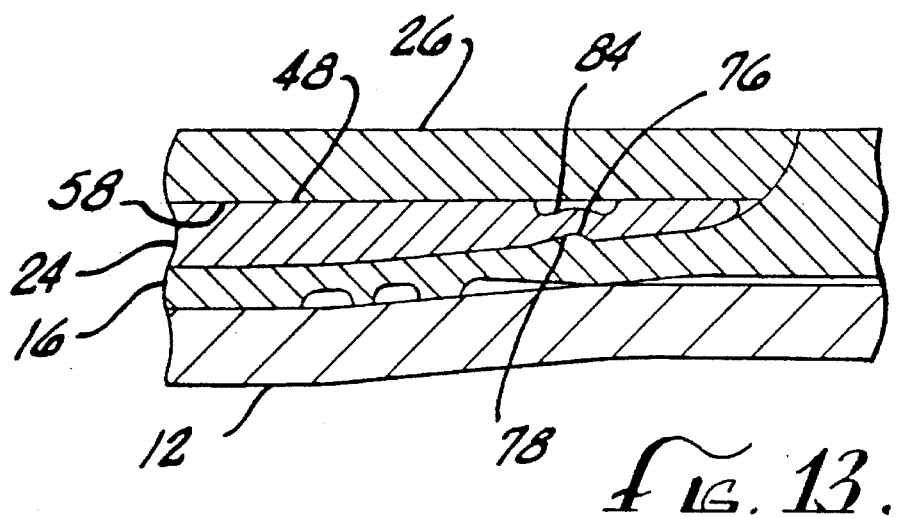
FIG. 13 is an enlarged cross-sectional view showing an alternative embodiment of the swaging ring assembly.

FIG. 13 shows another embodiment of the fitting 10, in which the inner surface 58 of the swaging ring 26 does not have any annular grooves 80 or 82 as in FIG. 8. Instead, an annular groove 84 is provided on the outer surface 48 of the insert 24. In this embodiment, the groove 84 is radially aligned with the annular groove 78 on the inner surface 52 of the insert 24. Thus, at the end of the swaging operation, when the protrusion 76 on the sleeve 16 springs back into the annular groove 78 on the insert 24, the material of the insert 24 can be deformed radially into the annular space defined by the groove 84.

FIGS. 14–17 show another embodiment of the fitting 10. In this embodiment, a special configuration and relationship is provided between the interacting surfaces of the sleeve 16 and the swaging ring assembly 22. This advantageously provides a positive locking relationship between the sleeve 16 and the swaging ring assembly 22, both before and after swaging. It also provides a fitting 10 that is relatively compact and lightweight, with enhanced capabilities to grip the tube 12 and resist flexure and pressure loading.

Figure 14:
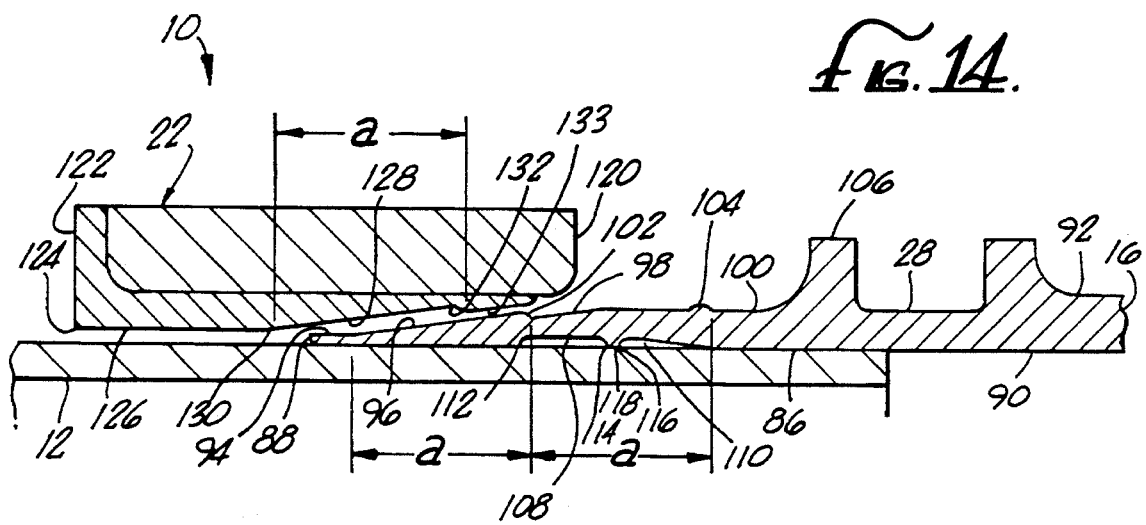
FIG. 14 is a cross-sectional elevational view of another embodiment of a fitting, showing a tube inserted into one end of the fitting prior to swaging, with a swaging ring ready to be moved onto a sleeve of the fitting prior to swaging.

More particularly, FIG. 14 shows an exploded view of the fitting 10, with the swaging ring assembly 22 positioned outwardly with respect to the sleeve 16. This exploded view helps illustrate the special configuration and relationship between the interacting surfaces of the sleeve 16 and the swaging ring assembly 22. Preliminarily, it will be noted that the swaging ring assembly 22 may be constructed from any suitable material. For example, the swaging ring assembly 22 may be constructed entirely from a homogenous material, or entirely from a composite material, or a combination of both. Thus, the swaging ring assembly 22 may be constructed as one piece entirely from any one of a group of homogenous materials, such as copper, brass, stainless steel, Incoloy, aluminum, titanium and other similar suitable homogenous materials. Alternatively, the swaging ring assembly 22 may be constructed from a composite material, as described above, or as a two-piece ring assembly 22 constructed from a combination of a homogenous material (i.e., for the swaging insert 24) and a composite material (i.e., for the swaging ring 26). For purposes of the following discussion, therefore, the swaging ring assembly 22 as a whole will be identified by the reference numeral 22 and referred to simply as a "swaging ring."

With reference to FIG. 14, the sleeve 16 has an inner end 86 and an outer end 88, and an inner surface 90 defining an axial bore for receiving the tube 12. The outer surface 92 of the sleeve 16 comprises a first cylindrical section 94 at the outer end 88 of the sleeve, followed by a first tapered surface 96, a second tapered surface 98 and a second cylindrical section 100. A first annular protrusion 102 is located between the first tapered surface 96 and the second tapered surface 98. A second annular protrusion 104 is located on the second cylindrical section 100 at a location inwardly from the first annular protrusion 102.

The axial length of the first tapered surface 96 on the sleeve 16 is represented by the letter "a" in the drawings. The axial distance between the first annular protrusion 102 and the second annular protrusion 104 on the sleeve 16 also is represented by the letter "a" and, therefore, is substantially the same dimension as the axial length of the first tapered surface 96. The outer surface 92 of the sleeve 16 also includes a ring stop 106, as in the previously described embodiments of the fitting 10.

The inner surface 90 of the sleeve 16 contains a plurality of annular grooves 108 and 110. These annular grooves 108 and 110 have sidewalls which meet with the inner surface of the sleeve to form edges 112, 114 and 116. The adjacent edges 114 and 116 between the annular grooves 108 and 110 are designed to form at least one tooth 118 whose edges, along with all of the other edges, are adapted to grip the tube 12. In particular, these edges 112, 114 and 116 are adapted to form material indentations in the tube 12 to create a secure connection between the sleeve 16 and the tube 12 upon swaging. The material of the tube 12 also deforms into the annular grooves 108 and 110 during the swaging process.

In accordance with the invention, all of the annular grooves 108 and 110 on the inner surface 90 of the sleeve 16 are positioned at an axial location on the sleeve inwardly from the first annular protrusion 102. In one embodiment, these annular grooves 108 and 110 on the inner surface 90 of the sleeve 16 are axially located substantially between the first annular protrusion 102 and the second annular protrusion 104. Further, since the edge 112 of the outermost annular groove 108 on the inner surface 90 of the sleeve 16 is radially aligned in the same plane with the first annular protrusion 102 (also corresponding to the end of the first tapered surface 96 and coincident with the greatest swage deformation), the gripping and sealing capabilities of the fitting 10 are significantly enhanced. These advantages are discussed below in connection with FIGS. 16-17.

With reference again to FIG. 14, the swaging ring 22 has an inner end 120, an outer end 122, and an inner surface 124 adapted to slide over the outer surface 92 of the sleeve 16 upon axial movement of the swaging ring in a forward direction over the sleeve. The inner surface 124 of the swaging ring 22 comprises a substantially cylindrical surface 126 at the outer end 122 and a basic tapered surface 128 at the inner end 120. The cylindrical surface 126 and the basic tapered surface 128 on the swaging ring 22 join each other to define a shoulder 130 on the swaging ring's inner surface 124. The basic tapered surface 128 of the swaging ring 22 also has an annular groove 132 positioned inwardly from the shoulder 130. The axial distance between the shoulder 130 and the annular groove 132 on the swaging ring 22 is represented by the letter "a", which is substantially the same as the axial length of the first tapered surface 96 on the sleeve 16. The swaging ring 22 also has a lead in tapered surface 133 at its inner end 120 to facilitate sliding of the swaging ring over the sleeve 16.

Figure 15:
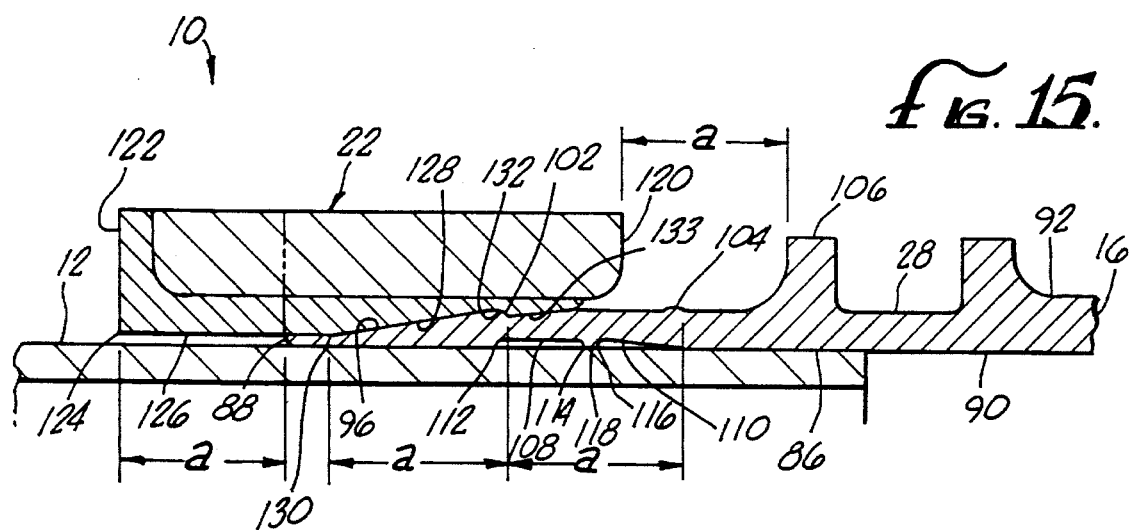
FIG. 15 is a cross-sectional elevational view of the fitting of FIG. 14, showing the swaging ring retained on the sleeve prior to swaging.

In FIG. 15, the swaging ring 22 and the sleeve 16 are initially assembled together, as in a pre-swaging position for shipping purposes. The swaging ring 22 and the sleeve 16 are assembled together by lightly forcing the swaging ring axially over the outer end 88 of the sleeve until the first annular protrusion 102 on the sleeve engages the annular groove 132 in the swaging ring. When this occurs, the first tapered surface 96 on the sleeve 16 and the basic tapered surface 128 on the swaging ring 22 will contact each other. Up to this point, however, all deformations of the sleeve 16 have been in the elastic range of the material, and no permanent deformation has occurred to decrease the internal diameter of the sleeve or to otherwise prevent insertion of the tube 12. In this pre-swaging position, the swaging ring 22 is held securely on the sleeve 16 to prevent it from loss or damage.

FIG. 15 also illustrates an important relationship between the swaging ring 22 and the sleeve 16 prior to swaging. In this pre-swaging position, the axial distance between the inner end 120 of the swaging ring 22 and the ring stop 106 is represented by the letter "a", which is substantially the same as the axial length of the first tapered surface 96 on the sleeve 16. In addition, the axial distance between the outer end 88 of the sleeve 16 and the outer end 122 of the swaging ring 16, also represented by the letter "a", is substantially the same as the axial length of the first tapered surface 96 on the sleeve.

Figure 16:
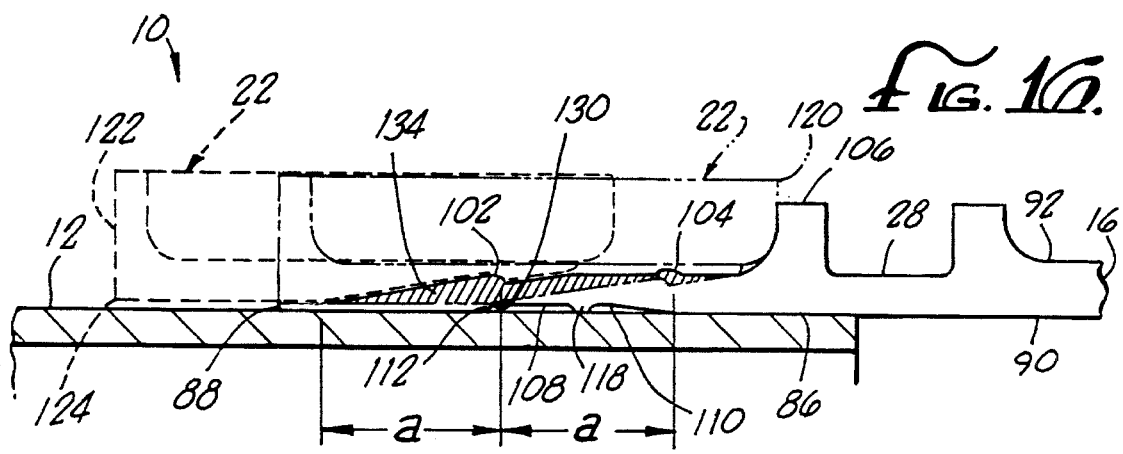
FIG. 16 is another cross-sectional elevational view of the fitting, showing the swaging ring in a position on the sleeve after swaging, with cross-hatching being used to represent the amount of fitting material deformed by the swaging operation.
Figure 17:
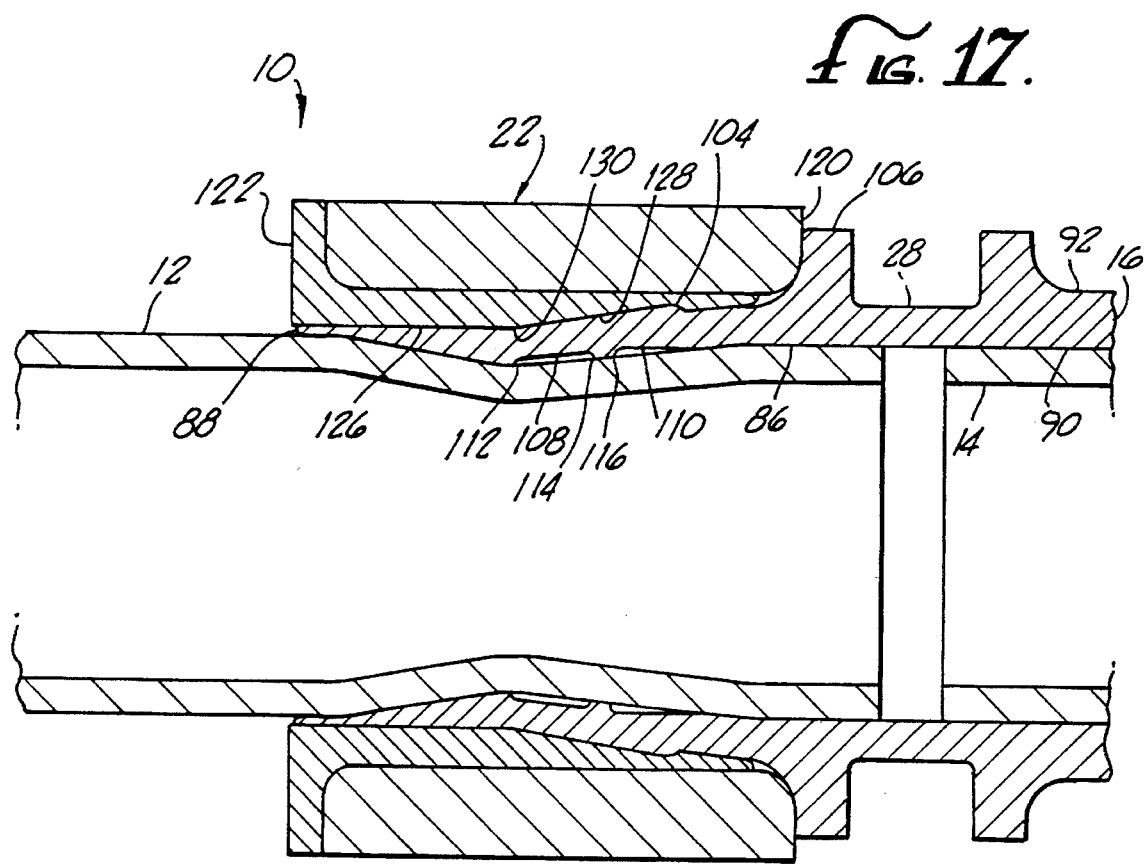
FIG. 17 is another cross-sectional elevational view of the fitting, showing the radial deformation that occurs after the conclusion of the swaging operation.

FIG. 16 shows the fitting 10 with the swaging ring 22 in two positions represented by phantom lines. In one position, the swaging ring 22 is in the pre-swaging position similar to FIG. 15. In the second position, the swaging ring 22 is in a post-swaging position, in which the swaging ring has been moved axially in a forward direction over the sleeve 16. In the post-swaging position, the swaging ring 22 applies radial force to the sleeve 16 to swage the sleeve to the tube 12. The cross-hatched region identified by the reference numeral 134 in FIG. 16 represents the amount of material of the sleeve 16 that is radially deformed against the tube 12 by the swaging ring 22. However, for purposes of illustration, the actual deformation of the sleeve 16 and the tube 12 is not shown. Instead, this is shown in FIG. 17, discussed below.

During axial movement of the swaging ring 22 over the sleeve 16, the basic tapered surface 128 on the swaging ring 22 applies radial swaging forces against the first tapered surface 96 on the sleeve, radially deforming the first annular protrusion 102 during the process. The interaction between these tapered surfaces 96 and 128 is designed to provide a relatively smooth axial load buildup to a relatively low peak load at the end of the swaging process.

In one embodiment, the angle of the first tapered surface 96 on the sleeve 16 is substantially the same as the angle of the basic tapered surface 128 on the swaging ring 22 (as measured from the axis of the fitting 10). This angle may fall within the range of about 3° to about 10°, depending on the size of the fitting 10, the system rated pressure and/or the material from which the tube 12 and sleeve 16 are made. By way of example, the tapered surfaces 96 and 128 on a size −04 fitting, for use with a titanium tube having an outside diameter of 0.250 in., may have an angle of about 4.5°. By way of further example, tapered surfaces 96 and 128 having an angle of about 7.75° are suitable for size −24 fittings for use with aluminum tubes having an outside diameter of 1,500 inches. These exemplary angles accomplish a radial swage with smooth axial load buildup.

In a post-swaging position, the inner end 120 of the swaging ring 22 abuts against the ring stop 106, after having travelled a distance "a". Before reaching the post-swaging position, the swaging ring 22 will have deformed the second annular protrusion 104 on the sleeve 16 during axial movement of the swaging ring over the sleeve. In the post-swaging position, however, the leading side of the annular groove 132 on the swaging ring 22 will be radially aligned with the inboard edge of the second annular protrusion 104 on the sleeve 16. At this point, the second annular protrusion 104, which was elastically deformed, will spring back into the annular groove 132. This engagement between the second annular protrusion 104 and the annular groove 132 creates a positive locking relationship between the sleeve 16 and the swaging ring 22. Hence, the engagement between these two components 104 and 132 at the swaging interface inhibits axial movement of the swaging ring 22 in a reverse direction over the sleeve 16.

As noted above, swaging of the fitting 10 is characterized by a smooth axial load buildup throughout most of the swaging cycle. However, at the very end of the swaging cycle, the axial force is first sharply increased and then sharply reduced. This indicates that the second annular protrusion 104 has engaged the annular groove 132, thereby indicating that the swaging ring 22 is positively locked in place with respect to the sleeve 16.

In the post-swaging position, it also can be seen from FIG. 16 that the shoulder 130 of the swaging ring 22 is radially aligned with the edge 112 of the outermost annular groove 108 on the inner surface 90 of the sleeve 16. The deformation of the sleeve 16 in this area by the shoulder 130 on the swaging ring 22, supplemented by the radial thickness of the first annular protrusion 102, generates a localized maximum radial deformation of the sleeve.

FIG. 17 illustrates the fitting 10 after swaging and the deformation that occurs between the sleeve 16 and the tube 12. This deformation resembles a necked down single wave (also called a "bell mouth") in the sleeve. As noted above, the maximum radial deformation occurs in the radial plane in which the shoulder 130, first annular protrusion 104 and edge 112 of the outermost annular groove 108 are aligned. By positioning all of the annular grooves 108 and 110 on the inner surface 90 of the sleeve 16 inwardly from this radial plane, the edges 112, 114 and 116 of the annular grooves 108 and 110 provide an excellent "grip" on the tube for resisting flexure and pressure loading. In this pressure loaded area, the edges 112, 114 and 116 of the annular grooves 108 and 110 generate localized material indentations on the back side of the wave form. This substantially enhances the gripping and metal-to-metal sealing capabilities of the fitting 10.

From the foregoing, it will be appreciated that the fitting 10 of this invention provides high tube retention capability and reliability, while still being extremely compact and lightweight in character. Moreover, prior to swaging, the ring assembly 22 is positively secured to the sleeve 16 to prevent loss or damage, and after swaging, it is securely locked onto the sleeve 16 to maintain its position and ensure a strong and secure connection. All of these features are accomplished by designing the fitting such that the total axial travel of the swaging ring 22 in relation to the sleeve 16 equals the axial length of the first tapered surface 96 on the sleeve. Therefore, at the end of the swaging operation, the annular groove 132 on the swaging ring 22 engages with the second annular protrusion 104 on the sleeve 16, positively securing the swaging ring to the sleeve. At this point, the shoulder 130 of the swaging ring 22 radially deforms the first annular protrusion 102, thereby improving the sleeve's grip on the tube 12.

While a particular form of the invention has been illustrated and described, it will be apparent that various modifications can be made without departing from the spirit and scope of the invention. Accordingly, it is not intended that the invention be limited, except as by the appended claims.

We claim:

1. A fitting for attachment to a tube by swaging, comprising:

(a) a sleeve having an inner end and an outer end, and having an inner surface defining an axial bore for receiving a tube and an outer surface comprising
  a first tapered surface adjacent to the outer end of the sleeve,
  a second tapered surface adjacent to the inner end of the sleeve that tapers from a minimum adjacent to the first tapered surface to a maximum adjacent to the inner end of the sleeve,
  a first annular protrusion located between the first tapered surface and the second tapered surface, and
  a second annular protrusion located inwardly from the first annular protrusion at a location adjacent to the inner end of the sleeve;

(b) at least one tooth on the inner surface of the sleeve adapted to grasp the tube and form a secure connection between the sleeve and the tube upon swaging; and (c) a substantially cylindrical swaging ring having an inner end, an outer end and an inner surface adapted to engage the outer surface of the sleeve upon axial movement of the swaging ring in a forward direction over the sleeve to thereby cause the swaging ring to apply a radial force to the sleeve to swage the sleeve to the tube, wherein the inner surface of the swaging ring comprises
  a substantially cylindrical surface at the outer end of the swaging ring,
  a basic tapered surface at the inner end of the swaging ring, and
  an annular groove in the basic tapered surface adapted to engage the first annular protrusion to hold the swaging ring onto the sleeve before swaging, and to engage the second annular protrusion to form a lock inhibiting relative axial movement in a rearward direction between the swaging ring and the sleeve after swaging.

2. The fitting of claim 1, wherein the axial lengths of the first tapered surface on the sleeve and the basic tapered surface on the swaging ring are substantially the same.

3. The fitting of claim 2, wherein the axial distance between the first annular protrusion and the second annular protrusion on the sleeve is substantially the same as the axial length of the first tapered surface on the sleeve.

4. The fitting of claim 3, wherein the cylindrical surface and the basic tapered surface on the swaging ring join each other to define a shoulder on the inner surface of the swaging ring.

5. The fitting of claim 4, wherein the axial distance between the shoulder and the annular groove on the swaging ring defines the axial length of the basic tapered surface on the swaging ring, and wherein this axial length is substantially the same as the axial length of the first tapered surface on the sleeve.

6. The fitting of claim 5, further comprising a ring stop on the outer surface of the sleeve that is adapted to stop movement of the swaging ring over the sleeve in a forward direction at the conclusion of the swaging operation.

7. The fitting of claim 6, wherein the axial distance between the inner end of the swaging ring and the ring stop, when the annular groove on the swaging ring is engaged with the first annular protrusion on the sleeve prior to swaging, is substantially the same as the axial length of the first tapered surface on the sleeve.

8. The fitting of claim 7, wherein the axial distance between the outer end of the sleeve and the outer end of the swaging ring, when the annular groove on the swaging ring is engaged with the first annular protrusion on the sleeve prior to swaging, is substantially the same as the axial length of the first tapered surface on the sleeve.

9. The fitting of claim 8, further comprising a plurality of annular grooves on the inner surface of the sleeve which provide a plurality of edges, at the points where vertical sidewalls of the grooves meet with the inner surface of the sleeve, forming said at least one tooth and at least three gripping edges, that are adapted to grasp the tube and form a secure connection between the sleeve and the tube upon swaging.

10. The fitting of claim 9, wherein the plurality of annular grooves on the inner surface of the sleeve are axially located substantially inwardly of the first annular protrusion.

11. The fitting of claim 9, wherein the plurality of annular grooves on the inner surface of the sleeve are axially located substantially between the first annular protrusion and the second annular protrusion.

12. The fitting of claim 10, wherein one of said edges of the plurality of annular grooves on the inner surface of the sleeve is substantially radially aligned with the first annular protrusion.

13. The fitting of claim 12, wherein the edge of one of said edges of the plurality of annular grooves on the inner surface of the sleeve is substantially radially aligned with the shoulder on the inner surface of the swaging ring at the conclusion of the swaging operation.

14. The fitting of claim 1, wherein the swaging ring is constructed entirely from a homogenous material.

15. The fitting of claim 14, wherein the homogenous material is selected from one of a group of materials comprising, copper, brass, stainless steel, Incoloy, aluminum and titanium.

16. A fitting for attachment to a tube by swaging, comprising:

(a) a sleeve having an inner end and an outer end, and having an inner surface defining an axial bore for receiving a tube and an outer surface comprising
a first tapered surface adjacent to the outer end of the sleeve,
a second tapered surface adjacent to the inner end of the sleeve that tapers from a minimum adjacent to the first tapered surface to a maximum adjacent to the inner end of the sleeve,
a first annular protrusion located between the first tapered surface and the second tapered surface, and
a second annular protrusion located inwardly from the first annular protrusion at a location adjacent to the inner end of the sleeve;

(b) at least one tooth on the inner surface of the sleeve that has an edge adapted to grasp the tube and form a secure connection between the sleeve and the tube upon swaging, wherein the edge is substantially radially aligned with the first annular protrusion; and (c) a substantially cylindrical swaging ring having an inner end, an outer end and an inner surface adapted to engage the outer surface of the sleeve upon axial movement of the swaging ring in a forward direction over the sleeve to thereby cause the swaging ring to apply a radial force to the sleeve to swage the sleeve to the tube, wherein the inner surface of the swaging ring comprises
a substantially cylindrical surface at the outer end of the swaging ring,
a basic tapered surface at the inner end of the swaging ring, wherein the cylindrical surface and the basic tapered surface join each other to define a shoulder, such that the edge of the tooth on the inner surface of the sleeve is substantially radially aligned with the shoulder at the conclusion of swaging, and
an annular groove in the basic tapered surface adapted to engage the first annular protrusion to hold the swaging ring onto the sleeve before swaging, and to engage the second annular protrusion to form a lock inhibiting relative axial movement in a rearward direction between the swaging ring and the sleeve after swaging.

* * * * *